United States Patent
Xiao et al.

(10) Patent No.: US 7,732,093 B2
(45) Date of Patent: Jun. 8, 2010

(54) TYPE OF NON-AQUEOUS ELECTROLYTE

(75) Inventors: Feng Xiao, Shenzhen (CN); Mingxia Wang, Shenzhen (CN); Guishu Zhou, Shenzhen (CN); Huaying You, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 146 days.

(21) Appl. No.: 11/595,218

(22) Filed: Nov. 9, 2006

(65) Prior Publication Data

US 2007/0105022 A1     May 10, 2007

(30) Foreign Application Priority Data

Nov. 10, 2005     (CN) ........................ 2005 1 0101336

(51) Int. Cl.
*H01M 6/14*     (2006.01)

(52) U.S. Cl. .................... 429/188; 429/300; 429/303

(58) Field of Classification Search ............... 429/188, 429/324–327, 330–332, 215, 307; 29/623.1–623.5; 252/364, 182.1, 500
See application file for complete search history.

(56) References Cited

U.S. PATENT DOCUMENTS

| | | | | |
|---|---|---|---|---|
| 3,433,679 | A * | 3/1969 | Johnson et al. | 429/207 |
| 4,740,437 | A * | 4/1988 | Fujii et al. | 429/213 |
| 5,691,081 | A * | 11/1997 | Krause et al. | 429/307 |
| 5,707,760 | A * | 1/1998 | Stux et al. | 429/188 |
| 6,403,256 | B1 * | 6/2002 | Gan et al. | 429/215 |
| 2002/0014616 | A1 * | 2/2002 | Allcock et al. | 252/500 |
| 2004/0062995 | A1 | 4/2004 | Yanagida et al. | |
| 2004/0091786 | A1 | 5/2004 | Unoki et al. | |
| 2005/0106470 | A1 * | 5/2005 | Yoon et al. | 429/324 |

\* cited by examiner

*Primary Examiner*—Dah-Wei D Yuan
*Assistant Examiner*—Claire L Rademaker
(74) *Attorney, Agent, or Firm*—Venture Pacific Law, PC

(57) ABSTRACT

This invention relates to non-aqueous electrolytes, in particular, a non-aqueous electrolyte for lithium-ion secondary batteries. The electrolyte comprises regular organic solvents and electrolyte saline. The special characteristics are: the electrolyte also comprises mixed additives, said mixed additives comprising at least one of those of compound group A, at least one of those of compound group B, and one of those of compound group C wherein: compound group A are selected from inorganic saline including $Li_2CO_3$, $Li_2SO_4$, $Li_2SO_3$, $LiNO_3$; compound group B are selected from vinylene carbonate, propylene carbonate; and compound group C are selected from ES, PS, DMS, DES, DMSO. The weight ratio can be A:B:C=0.1%-3.0%:0.5%-4.0%:1.0%-5.0%.

8 Claims, 2 Drawing Sheets

TYPE OF NON-AQUEOUS ELECTROLYTE

CROSS REFERENCE

This application claims priority from a Chinese patent application entitled "A Type of Non-Aqueous Electrolyte" filed on Nov. 10, 2005, having a Chinese Application No. 200510101336.8. This application is incorporated herein by reference in its entirety.

FIELD OF INVENTION

This invention relates to non-aqueous electrolytes. In particular, it relates to a type of non-aqueous electrolyte for lithium-ion secondary batteries.

BACKGROUND

As the demand for lithium-ion batteries increases, the requirement for the technology is higher as well, such that the batteries manufactured can have greater energy density and better electrochemical properties to meet the market demand. Here, enhancing the capacity of the lithium-ion batteries, their cycling performance, and the electrochemical properties at high and low temperatures is the trend for current and future technical improvements of the batteries.

Adding additives to the electrolyte to improve the properties of lithium-ion secondary batteries has been a research emphasis during the recent years. Since the SEI membrane (formed in the reactions between active matters and the electrolyte during the initial charging process) can suppress solvent from co-intercalating into the graphite and has no negative effects on the transmission of Li+, the characteristics of the additives are important factors in affecting the properties of a battery. Thus they have become an emphasis and focus for research. Currently, quite a few property-improving additives optimize the SEI membrane. For example, U.S. Patent 2004091786 discloses that by adding propylene sulfite (PS), a stable SEI membrane can be formed on the surface of the carbon negative electrode. This membrane will not break at high temperatures, blocks the reaction between the electrolyte and the negative electrode, restricts the creation of gases, and improves properties at high temperatures. A. Naji has discovered that by adding ethyl sulfite (ES) in a propylene carbonate (PC) electrolyte system, the co-intercalation phenomenon of PC in graphite is suppressed (see Electrochim. 2000, (145):1893). Chinese Patent CN1260850 discloses that by adding ES, the cycle life of batteries is improved. In addition, inorganic membrane-forming additives including carbon dioxide and sulfur dioxide can improve certain aspects of the properties of batteries. Many different researches show that by adding vinylene carbonate (VC), a passivation film can be formed on the surface of electrodes. The reduction potential of VC is higher than that of the solvents including ethylene carbonatediethyl carbonate (EC), PC, diethyl carbonate (DEC), dimethyl carbonate (DMC), etc. Thus VC can be reduced first on a carbon negative electrode and forms stable SEI membrane, thereby improving the stability of a battery in the cycle process, especially the stability at high temperatures (see J. Electrochem. Soc., 2001, 148:1341~1345). U.S. Patent 2004062995 discloses that by adding VC, a surface film can be formed, thereby preventing the dissolution of electrolyte and improving the cycle life.

Although by merely adding the above additives, the properties of the batteries can be improved to a certain degree, but the effect is not very distinctive. Often, a certain property is improved and the others are not affected. Since the additives are often costly, and some of the additives are used in a large amount when it is used by itself, the costs are greatly increased. As the market and customers increase their demand for high capacity and usability properties in different operating conditions, the industry is pushed for better products. Therefore, it is distinctively important to find an additive with good overall properties, or a combination of additives which can improve various properties of batteries. In addition, it is important that the cost of the additives must be within an acceptable range.

SUMMARY OF THE INVENTION

An object of this invention is to provide a type of non-aqueous electrolyte which can improve the capacity, cycle properties, and electrochemical properties of batteries;

Another object of this invention is to provide a type of non-aqueous electrolyte which can improve the performance of batteries at high and low temperatures.

Still another object of this invention is to provide a cost-effective type of non-aqueous electrolyte.

Briefly, the non-aqueous electrolyte for lithium batteries comprises regular organic solvents and electrolyte saline. The special characteristics are: it comprises mixed additives, where said mixed additives comprise at least one of those of compound group A, at least one of those of compound group B, and one of those of compound group C, where Compound group A is selected from inorganic saline including $Li_2CO_3$, $Li_2SO_4$, $Li_2SO_3$, $LiNO_3$; Compound group B is selected from vinylene carbonate (VC), propylene carbonate; and Compound group C is selected from ES, PS, dimethyl sulfone (DMS), diethyl sulfone (DES), Dimethyl Sulphoxide (DMSO). The preferred weight percentage of said ingredients of the mixed additives in the non-aqueous electrolyte of this invention are further specified.

An advantage of a battery having the non-aqueous electrolyte with the additives of this invention is that the battery would have good low-temperature properties An advantage of a battery having the non-aqueous electrolyte with the additives of this invention is that the battery would have good cycle properties.

Another advantage of a battery having the non-aqueous electrolyte with the additives of this invention is that the battery would have high capacity.

Yet another advantage of a battery having the non-aqueous electrolyte with the additives of this invention is that the battery would have lower swelling, where the amount of gases generated in the formation and cycle processes is greatly decreased.

DESCRIPTION OF FIGURES

The following are further descriptions of the preferred embodiments of the present invention with references to figures and examples of their applications.

DETAILED DESCRIPTION OF THE PREFERRED EMBODIMENT

Figure 1:
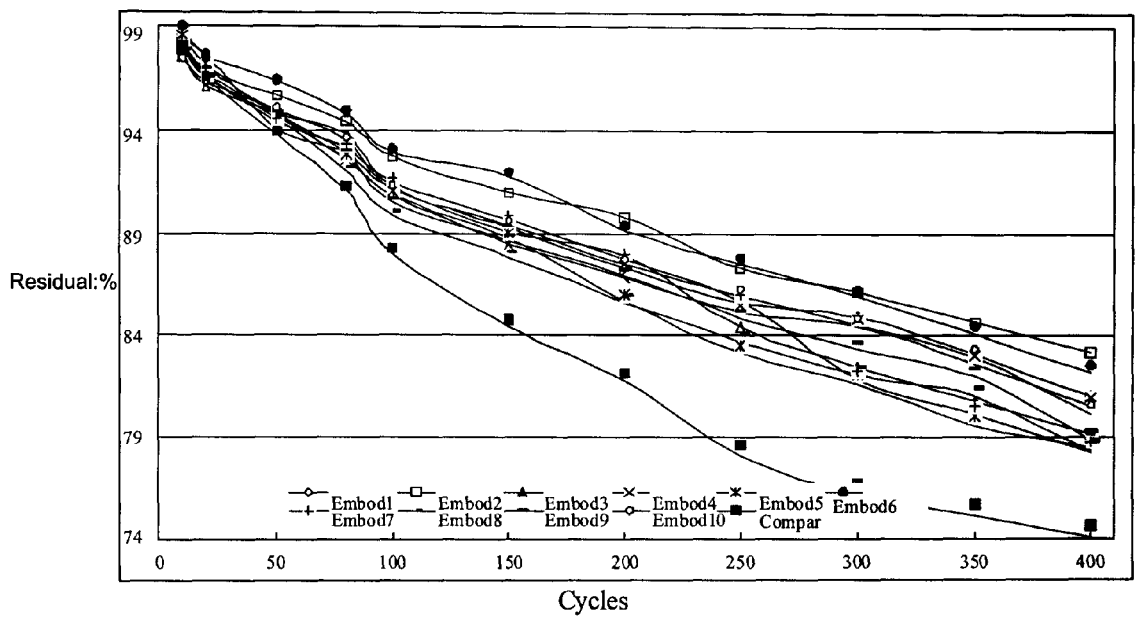
FIG. 1 is a comparative chart showing the cycle retention of an embodiment of this invention and a comparative example.

In the presently preferred embodiments of this invention, the non-aqueous electrolyte for lithium batteries comprises regular organic solvents and electrolyte saline. The special characteristics are: it comprises mixed additives, where said mixed additives comprise at least one of those of compound group A, at least one of those of compound group B, and one of those of compound group C.

Compound group A: selected from inorganic saline including $Li_2CO_3$, $Li_2SO_4$, $Li_2SO_3$, $LiNO_3$;

Compound group B: vinylene carbonate (VC), propylene carbonate;

Compound group C: ES, PS, dimethyl sulfone (DMS), diethyl sulfone (DES), Dimethyl Sulphoxide (DMSO);

The weight percentage of said ingredients of the mixed additives in the non-aqueous electrolyte:
- compound group A: 0.1%-3.0%;
- compound group B: 0.5%-4.0%;
- compound group C: 1.0%-5.0%.

The preferred weight percentage of said ingredients of the mixed additives in the non-aqueous electrolyte of this invention:
- compound group A: 0.3%-2.0%;
- compound group B: 1.0%-3.0%;
- compound group C: 1.0%-3.0%.

The more preferred weight percentage of said ingredients of the mixed additives in the non-aqueous electrolyte of this invention:
- compound group A: 0.5%-1.0%;
- compound group B: 1.0%-3.0%;
- compound group C: 1.0%-2.0%

A battery having the non-aqueous electrolyte with the additives of this invention have the following advantages:

1. Good low-temperature properties, meaning at −10° C., discharging the battery at 1 C, a battery having the additives has an initial capacity at 2.7V, about 10% higher than a battery without the additives.

2. Good cycle properties, meaning LP043450 batteries can have a residual capacity percentage of 80% after 400 cycles.

3. High capacity, meaning after adding the additives of this invention, the discharge capacity at 1 C is about 10-30 mAh higher than those not having the additives.

4. Lower swelling, the amount of gases generated in the formation and cycle processes is greatly decreased.

The following is a detailed description of various embodiments of this invention. Comparative charts are provided to further illustrate this invention.

1. The non-aqueous electrolyte comprises (1) organic solvent, (2) electrolyte saline, and (3) mixed additives.

(1) Normally, the organic solvent series can be carbonate, carboxylic ester, sulfurized carboxylic ester, or a random combination of ketone, sulfone, furan, and ether. The carbonate can be ring carbonate or chain carbonate. The ring carbonate includes various frequently used organic solvents, mainly including EC, PC, 1,3-dioxolane(DOL), butylene carbonate(BC), and the ramification of the saline. The chain carbonate includes various frequently used chain carbonate such as dimethyl carbonate (DMC), diethyl carbonate (DEC), ethylmethyl carbonate (EMC), methyl acetate(MF), etc. and their ramification. The furan can be tetrahydrofuran or its ramification. Currently the carbonate is most thoroughly researched, and is relatively ideal choice for the organic solvent. In the embodiment of this invention, the organic solvents are a combined system with a ration of: EC:EMC:DEC=2:2:1.

(2) Normally, the electrolyte saline can be selected randomly from one or a mixture of the following including $LiPF_6$, $LiAsF_6$, $LiClO_4$, $LiBF_4$, $LiCF_3CO_2$, $Li(CF_3CO_2)_2N$, $LiCF_3SO_3$, $Li(CF_3SO_2)_3$, $Li(CF_3SO_2)_2N$ etc. This embodiment uses $LiPF_6$ and a solution of 1.0 mol/L is created with the above organic solvent.

(3) The mixed additives added to the non-aqueous electrolyte of this invention comprise at least one compound of Compound group A, at least one compound of Compound group B, and at least one compound of Compound group C:

Compound group A: inorganic lithium-salt selected from $Li_2CO_3$, $Li_2SO_4$, $Li_2SO_3$, $LiNO_3$;

Compound group B: VC, PC;

Compound group C: ES, PS, DMS, DES, DMSO.

2. There are three ways of mixing the above organic solvents, electrolyte saline, and the mixed additives. Here, in the exemplary mixed additives, the preferred Compound group A is $Li_2CO_3$, the preferred Compound group B is VC, and the preferred Compound group C is ES:

(1) First, the organic solvents are mixed well based on the required ratio and put aside. Then $Li_2CO_3$, VC, and ES are mixed together, shaken well and put aside for 0-24 hours before being added to the prepared mixed organic solvent. The mixture is sealed, taken out and fired in a vacuum oven at 20-90° C. vacuum or directly baked for 2-24 hours. It is placed in a glove box and the electrolytes are added. It is shaken and put aside for above 24 hours.

(2) First, the organic solvents are added, and then $Li_2CO_3$ is added. The mixture is sealed, taken out and fired in a vacuum oven at 20-90° C. vacuum or directly baked for 2-24 hours. Then the mixture is put in a glove box where VC and ES are added. The mixture is shaken well and put aside for over 24 hours.

(3) First, VC and ES are added to the organic solvents. Then the mixture is put aside for 0-24 hours. Then $Li_2CO_3$ is added. The mixture is sealed, taken out and fired in a vacuum oven at 20-90° C. vacuum or directly baked for 2-24 hours. Then $LiPF_6$ is added in the mixture in a glove box. The mixture is shaken well and put aside for over 24 hours.

All the above solvents, additives and electrolyte saline are added in a glove box. The effect of moisture and other matters should be carefully controlled. Method (2) above is preferred for the embodiments of this invention.

3. When the fluid is injected, the following methods can be used:

a. The fluid can be directly injected using a designed manual filling machine in a glove box, and the electrolyte fluid can be heated to a temperature of 20-80° C.

b. The fluid can be injected using an automatic filing machine of the assembly line.

c. The fluid can be injected using a manual filling machine in a glove box. The electrolyte fluid is shaken well before injection and it can be heated to a temperature of 20-80° C.

d. The fluid can be injected using a manual filling machine in a glove box while being stirred. The fluid can be stirred using a magnetic-powered stirrer, and it can be heated to a temperature of 20-80° C.

Solution d is preferred embodiment of this invention.

By adjusting the combination and amount of the three groups of compounds A, B and C in the additives, embodiments 1-10, as well as the comparative examples can be obtained.

Embodiment 1

The non-aqueous electrolyte comprises mixed additives of 0.3% weight percentage of solid inorganic saline $Li_2CO_3$, 1.0% of VC, and 1.5% of ES.

Embodiment 2

The non-aqueous electrolyte comprises mixed additives of 0.8% weight percentage of solid inorganic saline $Li_2CO_3$, 2.0% of VC, and 1.5% of ES.

Embodiment 3

The non-aqueous electrolyte comprises mixed additives of 0.5% weight percentage of solid inorganic saline $Li_2CO_3$, 3.0% of VC, and 3.0% of ES.

Embodiment 4

The non-aqueous electrolyte comprises mixed additives of 1.0% weight percentage of solid inorganic saline $Li_2CO_3$, 1.0% of VC, and 2.0% of ES.

Embodiment 5

The non-aqueous electrolyte comprises mixed additives of 1.0% weight percentage of solid inorganic saline $Li_2CO_3$, 2.0% of VC, and 5.0% of ES.

Embodiment 6

The non-aqueous electrolyte comprises mixed additives of 1.0% weight percentage of solid inorganic saline $Li_2CO_3$, 4.0% of VC, and 1.0% of PS.

Embodiment 7

The non-aqueous electrolyte comprises mixed additives of 3.0% weight percentage of solid inorganic saline $Li_2CO_3$, 0.5% of VC, and 3.0% of ES.

Embodiment 8

The non-aqueous electrolyte comprises mixed additives of 0.1% weight percentage of solid inorganic saline $Li_2CO_3$, 1.0% of VC, and 2.0% of ES.

Embodiment 9

The non-aqueous electrolyte comprises mixed additives of 1.0% weight percentage of solid inorganic saline $Li_2CO_3$, 0.5% of VC, and 1.0% of ES.

Embodiment 10

The non-aqueous electrolyte comprises mixed additives of 1.0% weight percentage of solid inorganic saline $Li_2CO_3$, 2.0% of VC, and 1.5% of ES.

COMPARATIVE EXAMPLE

The non-aqueous electrolyte of the comparative example does not contain mixed additives.

The ingredients and contents of the embodiments and comparative examples are shown in Chart 1.

CHART 1

| | Compound group A | | Compound group B | Compound group C | |
|---|---|---|---|---|---|
| | $Li_2CO_3$ | $Li_2SO_3$ | VC | ES | PS |
| Embodiment 1 | 0.3 | | 1.0 | 2.0 | |
| Embodiment 2 | 0.8 | | 2.0 | 1.5 | |
| Embodiment 3 | 0.5 | | 3.0 | 3.0 | |
| Embodiment 4 | | 1.0 | 1.0 | 2.0 | |
| Embodiment 5 | 1.0 | | 2.0 | 5.0 | |
| Embodiment 6 | 1.0 | | 4.0 | | 1.0 |
| Embodiment 7 | 3.0 | | 0.5 | 3.0 | |
| Embodiment 8 | 0.1 | | 1.0 | 2.0 | |
| Embodiment 9 | 1.0 | | 0.5 | 1.0 | |
| Embodiment 10 | 1.0 | | 2.0 | 1.5 | |
| Comparative Example | 0 | | 0 | 0 | |

Unit: (wt %)

The following is the test result of the above embodiments and comparative example.

1. The Other Elements of a Battery

Positive Electrode Plate 95 wt % $LiCoO_2$, 3 wt % PVDF, and 2 wt % acetylene black are mixed. Then N-methylpyrrolidone is further added to the mixture. The resulting mixture is fully stirred to formed an evenly disperse slurry. Using a stretcher, the evenly disperse slurry is spread on both sides of an aluminum foil of 18 μm. A positive electrode plate is made after the foil is heated in a vacuum environment and cut to obtain the desired size.

Negative Electrode Plate 95 wt % graphite, 2 wt % dispersant, 3 wt % adhesive PVDF, and a certain amount of water are stirred well to form a slurry. Using a stretcher, the mixture is spread on both sides of an aluminum foil of 12 μm. A negative electrode plate is made after the foil is heated in a vacuum environment and cut to obtain the desired size.

Membrane: 20 μm PE Tonen membrane.

Battery designed to LP043450, designed capacity is 1 C+800 mAh.

2. Tested Items (1) Capacity Test

A. Tester: BS-9300 (R) secondary battery properties testing device;

B. Testing conditions: normal temperature, relative humidity: 25-85%;

C. Charging mode: constant current constant voltage to 4.2 V;

D. The capacity testing results of the batteries (see Chart 2).

CHART 2

| | Capacity 1 | Capacity 2 | Capacity 3 | Capacity 4 | Capacity 5 | Capacity 6 | Average Capacity |
|---|---|---|---|---|---|---|---|
| Embodiment 1 | 812 | 815 | 824 | 834 | 825 | 817 | 821.2 |
| Embodiment 2 | 833 | 826 | 839 | 841 | 824 | 823 | 831 |
| Embodiment 3 | 833 | 825 | 818 | 821 | 824 | 830 | 825.2 |
| Embodiment 4 | 832 | 819 | 835 | 829 | 828 | 825 | 828 |
| Embodiment 5 | 804 | 817 | 822 | 831 | 820 | 814 | 818 |
| Embodiment 6 | 845 | 829 | 825 | 826 | 819 | 840 | 830.7 |
| Embodiment 7 | 818 | 824 | 814 | 829 | 822 | 812 | 819.8 |
| Embodiment 8 | 822 | 818 | 811 | 808.8 | 814 | 823 | 816.1 |

CHART 2-continued

| | Capacity 1 | Capacity 2 | Capacity 3 | Capacity 4 | Capacity 5 | Capacity 6 | Average Capacity |
|---|---|---|---|---|---|---|---|
| Embodiment 9 | 815 | 808 | 831 | 827 | 810 | 828 | 819.8 |
| Embodiment 10 | 825 | 820 | 832 | 818 | 827 | 820 | 823.7 |
| Comparative Example | 797 | 803 | 814 | 808 | 811 | 798 | 805.2 |

(Unit: mAh)

(2) Cycles at Regular Temperature

A. Testing instrument: BS-9300 (R) secondary battery properties testing device, vernier calipers, etc.

B. Testing conditions: normal temperature, relative humidity: 25-85%

C. Charging mode: constant current constant voltage to 4.2 V

D. Discharging mode: constant current constant voltage to 3.0 V

E. Charging and discharging current: 1 C

F. Recording method: recording each cycle capacity using computers, and manually measure the thickness of the batteries every 100 cycles.

G. Test results of the cycle residue rate (see FIG. 1)

H. Test results of the thickness of the batteries in the formation and cycle processes (see FIG. 2)

(3) Discharging at Low Temperatures

A. Testing instrument: hygrothermostat

B. Testing conditions: −10° C., for 90 minutes

C. Discharging current: 1C

D. Recording method: specific capacity at 3.1V, 3.0V, and 2.75V

E. Test results of discharging at low temperatures (see Chart 3)

CHART 3

| | −10° C., 1 C Discharging | | |
|---|---|---|---|
| Electrolyte and Conditions | 3.1 V/Initial Capacity (%) | 3.0 V/Initial Capacity (%) | 2.75 V/Initial Capacity (%) |
| Embodiment 1 | 55.2 | 57.4 | 61.5 |
| Embodiment 2 | 64.1 | 66.7 | 68.3 |
| Embodiment 3 | 58.2 | 61.5 | 66.1 |
| Embodiment 4 | 57.4 | 61.4 | 64.3 |
| Embodiment 5 | 52.5 | 55.6 | 58.7 |
| Embodiment 6 | 60.4 | 64.3 | 67.7 |
| Embodiment 7 | 57.6 | 62.4 | 65.1 |
| Embodiment 8 | 52.6 | 57.2 | 62.4 |
| Embodiment 9 | 56.7 | 59.4 | 63.2 |
| Embodiment 10 | 60.3 | 64.2 | 66.4 |
| Comparative Example | 47.8 | 49.2 | 54.3 |

3. Evaluation

As shown in Chart 2, in the embodiments, after the three mixed additives are added, the capacity of the battery has substantially increased. The highest capacity sees an increase of 25 mAh, and the effect is distinctive. The properties of embodiments 2, 3, 4, and 6 are especially good. The reason is that by adding $Li_2CO_3$ or other inorganic saline, the loss of Li in the process of membrane-forming is compensated, decreasing irreversible capacity. VC allows the SEI membrane to be dense with strong structure.

Referring to FIG. 1, it is shown in the comparative figure of cycle residue rates that, the capacity of the comparative example battery without the additives declines very quickly, to about 80% after over 200 cycles. However, the embodiments have good cycle effects. Specially, embodiments 1, 2, 4, 6, and 10 have a cycle residue rate of 80% after 400 cycles. It shows that by adding the mixed additives, the cycles have distinctively improved.

Figure 2:
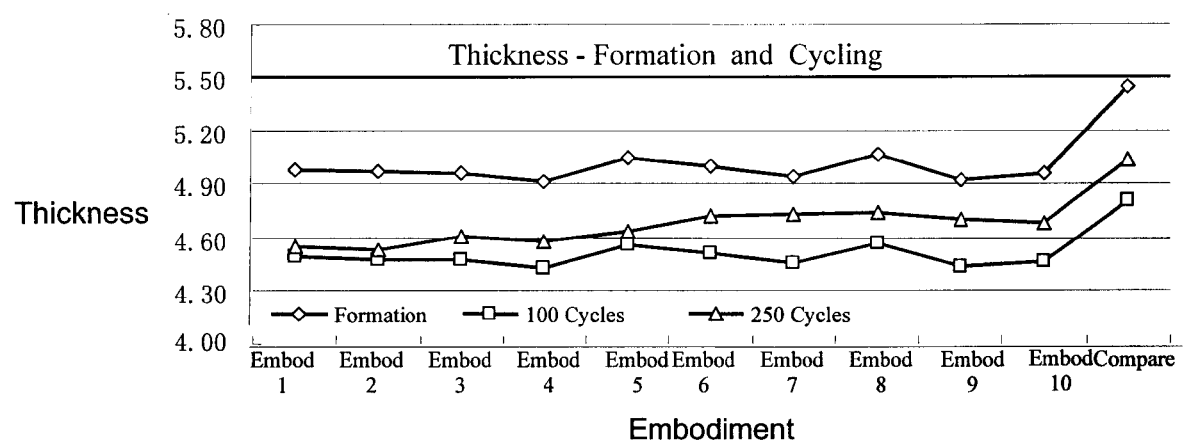
FIG. 2 is a comparative chart showing the thickness of the embodiment of this invention and a comparative example in the cycle procedure.

Referring to FIG. 2, the thickness of the battery before formation is measured using vernier calipers. The thickness after 100 cycles and 250 cycles is tested for the average of three points—the top, middle, and bottom of the battery. As shown in the figure, by adding the mixed additives, the amount of gases in the formation decreases. Meanwhile, the swelling during the cycle process is curbed. That is mainly due to the effect of VC and ES, which form a fine SEI membrane on the surface of the negative electrode, thereby reducing the amount of gases generated by the co-intercalation of the solvents in the reactions of the solvents with the SEI membrane.

Referring to Chart 3, the battery is discharged at 1 C at −10° C. Each embodiment has a discharging capacity at low temperatures better than that of the comparative example. Here, the 2.75V/initial capacity (%) of embodiment 2 at −10° C. is higher than that of the comparative example without the mixed additives by about 14%. The effect on discharging at low temperatures is distinctive.

Thus it is shown that the object of this invention can be achieved when the weight percentages of the ingredients of the mixed additives in the non-aqueous electrolyte are:

compound group A: 0.1%-3.0%;
compound group B: 0.5%-4.0%;
compound group C: 1.0%-5.0%.

The preferred weight percentages are:
compound group A: 0.3%-2.0%;
compound group B: 1.0%-3.0%;
compound group C: 1.0%-3.0%.

The more preferred weight percentages are:
compound group A: 0.5%-1.0%;
compound group B: 1.0%-3.0%;
compound group C: 1.0%-2.0%.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but all those other and further alterations and modifications as would be apparent to those of ordinary skilled in the art.

We claim:

1. A non-aqueous electrolyte comprising organic solvents, electrolyte saline, and mixed additives, said mixed additives comprising: at least a compound of compound group A, at least a compound of compound group B, and the compound of compound group C, wherein:

compound group A are selected from inorganic saline including Li2SO4 and Li2SO3;

compound group B are selected from vinylene carbonate, and propylene carbonate; and compound group C is diethyl sulfone, and wherein the weight percentages of the compounds of the mixed additives in the non-aqueous electrolyte are: compound group A: 0.1%-3.0%; compound group B: 0.5%-4.0%; and compound group C: 1.0%-5.0%.

2. The non-aqueous electrolyte of claim 1, wherein the weight percentages of the compounds of the mixed additives in the non-aqueous electrolyte: compound group A: 0.3%-2.0%; compound group B: 1.0%-3.0%; and compound group C: 1.0%-3.0%.

3. The non-aqueous electrolyte of claim 1, wherein the weight percentages of the compound of the mixed additives in the non-aqueous electrolyte: compound group A: 0.5%-1.0%; compound group B: 1.0%-3.0%; and compound group C: 1.0%-2.0%.

4. The non-aqueous electrolyte of claim 1, wherein the compound group A also includes Li2CO3.

5. The non-aqueous electrolyte of claim 1, wherein the compound group C also includes ES.

6. The non-aqueous electrolyte of claim 4, wherein the compound group C also includes ES.

7. The non-aqueous electrolyte of claim 1, wherein the compound group C also includes PS.

8. The non-aqueous electrolyte of claim 4, wherein the compound group C also includes PS.

* * * * *